US007212872B1

(12) United States Patent
Smith et al.

(10) Patent No.: US 7,212,872 B1

(45) Date of Patent: May 1, 2007

(54) DISCRETE MULTICHANNEL AUDIO WITH A BACKWARD COMPATIBLE MIX

(75) Inventors: William P. Smith, Co. Down (GB); Stephen M. Smyth, Newtownards (GB); Ming Yan, Bangor (GB); Yu-Li You, Thousand Oaks, CA (US)

(73) Assignee: DTS, Inc., Agoura Hills, CA (US)

( * ) Notice: Subject to any disclaimer, the term of this patent is extended or adjusted under 35 U.S.C. 154(b) by 0 days.

(21) Appl. No.: 09/568,355

(22) Filed: May 10, 2000

(51) Int. Cl.
*G06F 17/00* (2006.01)
*H04R 5/00* (2006.01)
*H04R 5/02* (2006.01)

(52) U.S. Cl. ........................... 700/94; 381/27; 381/307

(58) Field of Classification Search .................... 381/1, 381/17, 18, 19, 20, 21, 22, 23, 27, 307, 119; 700/94; 340/825, 24; 704/500
See application file for complete search history.

(56) References Cited

U.S. PATENT DOCUMENTS

| | | | | |
|---|---|---|---|---|
| 3,787,622 A | 1/1974 | Itoh et al. | 179/100 |
| 5,319,713 A | 6/1994 | Waller, Jr. et al. | 381/22 |
| 5,530,655 A | 6/1996 | Lokhoff et al. | |
| 6,442,278 B1 * | 8/2002 | Vaudrey et al. | 381/27 |

FOREIGN PATENT DOCUMENTS

| | | |
|---|---|---|
| EP | 599825 B1 | 1/1994 |
| WO | WO 97 21310 A | 6/1997 |
| WO | WO 9721310 A2 * | 6/1997 |
| WO | WO 98 20709 | 5/1998 |
| WO | WO 9957941 | 11/1999 |
| WO | WO 0004744 | 1/2000 |

OTHER PUBLICATIONS

Blumlein, Alan Dower, British Patent Specification 394,325, Stereophonic Techniques, Reprinted From Jaes, vol. 6, No. 2, p. 91, (1958) pp. 32-40.

International Organisation for Standardisation Organisation Internationale de Normalisation, Coding of Moving Pictures and Associated Audio, Nov. 11, 1994, 115 pages.

* cited by examiner

*Primary Examiner*—Xu Mei
(74) *Attorney, Agent, or Firm*—Eric Gifford; Blake Welcher

(57) ABSTRACT

A multichannel audio format provides a truly discrete as well as a backward compatible mix for surround-sound, front or other discrete audio channels in cinema, home theater, or music environments. The additional discrete audio signals are mixed with the existing discrete audio channels into a predetermined format such as the 5.1 audio format. In addition these additional discrete audio channels are encoded and appended to the predetermined format as extension bits in the bitstream. The existing base of multichannel decoders can be used in combination with a mix decoder to reproduce truly discrete N.1 multichannel audio.

6 Claims, 13 Drawing Sheets

DISCRETE MULTICHANNEL AUDIO WITH A BACKWARD COMPATIBLE MIX

BACKGROUND OF THE INVENTION

1. Field of the Invention

This invention relates to multichannel audio and more specifically to a multichannel audio format that provides a truly discrete as well as a backward compatible mix for surround-sound, front or other discrete audio channels in cinema, home theater, or music environments.

2. Description of the Related Art

Multichannel audio has become the standard for cinema and home theater, and is gaining rapid acceptance in music, automotive, computers, gaming and other audio applications. Multichannel audio provides a surround-sound environment that greatly enhances the listening experience and the overall presentation of any audio-visual system. The earliest multichannel systems included left, right, center and surround (L, R, C, S) channels. The current standard in consumer applications is 5.1 channel audio, which splits the surround channel into left and right surround channels and adds a subwoofer channel (L, R, C, Ls, Rs, Sub).

The move from stereo to multichannel audio has been driven by a number of factors paramount among them being the consumers' desire for higher quality audio presentation. Higher quality means not only more channels but higher fidelity channels and improved separation or "discreteness" between the channels. In a truly discrete environment, discrete channels carry discrete audio signals to discrete speakers.

To satisfy this demand, the audio industry had to provide a multichannel mix from the studio or content provider, multichannel encoding/decoding techniques, a media capable of supporting multichannel audio and multichannel speaker configurations. By its very nature, multichannel audio includes significantly more data than stereo audio, which has to be compressed to fit in the existing formats and on the existing media. With the advent of media such as DVD, new formats such as 5.1 have been developed specifically for multichannel audio to enhance the listening experience.

The extension of multichannel audio beyond the 5.1 standard has once again raised the challenge of developing new encoding/decoding techniques that move the state-of-the-art forward while maintaining backward compatibility with the 5.1 standard. Having become accustomed to discrete audio, the consumer will demand the same performance as more channels are added. Backward compatibility is critical because of the great investment in 5.1 equipment by consumers and professionals alike.

Dolby Prologic™ provided one of the earliest multichannel systems. Prologic squeezes 4-channels (L, R, C, S) into 2-channels (Lt,Rt) by introducing a phase-shifted surround sound term. These 2-channels are then encoded into the existing 2-channel formats. Decoding is a two step process in which an existing decoder receives Lt,Rt and then a Prologic decoder expands Lt,Rt into L, R, C, S. Because four signals (unknowns) are carried on only two channels (equations), the Prologic decoding operation is only an approximation and cannot provide true discrete multichannel audio. As shown in FIG. 1, a studio 10 will mix several, e.g. 48, audio sources to provide a four-channel mix (L, R, C, S). (This mix may be monitored through a matrix encode and decode process.) The Prologic encoder 12 matrix encodes this mix as follows:

$$Lt = L + 0.707C + S(+90°),\text{ and} \tag{1}$$

$$Rt = R + 0.707C + S(-90), \tag{2}$$

which are carried on the two discrete channels, encoded into the existing two-channel format and recorded on a media 14 such as film.

A matrix decoder 16 decodes the two discrete channels Lt,Rt and expands them into four discrete reconstructed channels Lr, Rr, Cr and Sr. A passive matrix decoder decodes the audio data as follows:

$$Lr = Lt,$$

$$Rr = Rt,$$

$$Cr = (Lt + Rt)/2,\text{ and}$$

$$Sr = (Lt - Rt)/2.$$

In general, the Lr and Rr channels have significant center and surround components and Cr and Sr have left and right components. The reproduced audio signals, although carried on discrete channels to discrete speakers in a speaker configuration 18, are not discrete, but in fact are characterized by significant crosstalk and phase distortion. For this reason passive decoders are rarely used.

Active matrix decoders reduce crosstalk and phase distortion but at best approximate a discrete audio presentation. Many different proprietary algorithms are used to perform an active decode and all are based on measuring the power of Lt+Rt, Lt−Rt, Lt and Rt to calculate gain factors Gi whereby, $$Lr = G1 * Lt + G2 * Rt$$

$$Rr = G3 * Lt + G4 * Rt$$

$$Cr = G5 * Lt + G6 * Rt,\text{ and}$$

$$Sr = G7 * Lt + G8 * Rt.$$

Active decode provides better compensation based on the power of the signal but crosstalk among components remains and true discrete reproduction is not possible.

The advent of the 5.1 format represented a fundamental shift in multichannel audio away from squeezing multiple channels into an existing stereo format and the phase distortion and crosstalk associated with matrix coding and to a truly discrete multichannel format, which provides higher fidelity and improved separation and directionality. Furthermore, two additional channels were added. The subwoofer ("Sub") (0.1 channel) provides enhanced low frequency capability. The surround channel S consists of left Ls and right Rs channels indicating the consumers' strong preference for true discrete sound even in the surround channels. Each signal (L, C, R, Ls, Rs, Sub) is compressed independently and then mixed together in a 5.1 format thereby maintaining the discreteness of each signal. Dolby AC-3™, Sony SDDS™ and DTS Coherent Acoustics™ are all examples of 5.1 systems.

As shown in FIG. 2, the studio 20 provides a 5.1 channel mix. A 5.1 encoder 22 compresses each signal or channel independently, multiplexes them together and packs the audio data into a given 5.1 format, which is recorded on a suitable media 24 such as a DVD. A 5.1 decoder 26 decodes the bitstream a frame at a time by extracting the audio data, demultiplexing it into the 5.1 channels and then decompressing each channel to reproduce the signals (Lr, Rr, Cr, Lsr, Rsr, Sub). These 5.1 discrete channels, which carry the 5.1 discrete audio signals are directed to the appropriate discrete speakers in speaker configuration 28 (subwoofer not shown).

In its cinema products, DTS implemented its 5.1 system with 5 single channel APT-X encoders by taking advantage of the spectral characteristics of the surround and subwoofer channels without sacrificing performance. The use of five rather than six processors reduced system cost As shown in FIG. 3, the 5.1 signal is reformatted into a 5 channel signal with a mixer 32 that mixes the Ls, Sub and Rs into two channels using standard studio mixing techniques, i.e. the sub is reduced by 3 dB and added to the L and R surround channels. More specifically, the left and right surround channels Ls, Rs are high pass filtered, the subwoofer channel Sub is low pass filtered, and then mixed together. The Sub channel carries low frequencies and has a bandwidth less than 150 Hz and the Ls and Rs signals have only minimal low frequency content. An APT-X decoder 34 decodes the five channels and passes Lts and Rts to a demixer 36, which high pass filters them to reproduce Lrs and Rrs, and low pass filters and sums them to reproduce the subwoofer channel Sub.

Extension to discrete 6.1 and higher multichannel formats is limited by space availability on the media, reliability and the strong desire to maintain backward compatibility with existing 5.1 decoders. Multichannel audio consumes a lot of space on the medium. Providers want to extend playtime, include multiple different audio formats including 2-channel PCM, Dolby AC-3 and DTS Coherent Acoustics, add other content such as director's comments, outtakes, etc.

Dolby has developed Dolby EX, as described in PCT Publication W099/57941, which provides more than two surround-sound channels in the current 5.1 formats and does so without increasing space requirements (number of bits or film space). Dolby EX provides more than two surround sound channels within the format of a digital soundtrack system designed to provide only two surround sound channels. Three main channels are recorded in the discrete soundtrack channels and 3, 4 or 5 surround-sound channels are matrix-encoded and recorded in two discrete surround-sound soundtrack channels. The digital audio stream of the digital soundtrack system designed to provide only two surround sound channels remains unaltered, thus providing compatibility with existing playback equipment. Moreover, the format of the media carrying the digital sound tracks is unaltered. Dolby asserts that the "discreteness" of the digital soundtrack system is not audibly diminished by employing matrix technology to surround sound channels, particularly if active matrix decoding is employed.

Dolby EX introduces phase-shifted surround sound terms to matrix encode the 3, 4 or 5 surround-sound signals into two channels, which facilitates decoding the two channels into 3, 4 or 5 audio channels. The introduction of the phase-shifted terms is essential to Dolby EX as it was to Dolby Prologic. The encoding process is given by the following generalized equations:

$$Lts=Ls+\Sigma Gi*Si(\phi i) \text{ for } i=0, 1, 2, \text{ and}$$

$$Rts=Rs+\Sigma Hi*Si(-\phi i) \text{ for } i=0, 1, 2$$

where Gi and Hi are the gain coefficients, Si are the additional surround-sound channels and $\phi$i are the phase distortion components. The decoding process is given by the following generalized equations:

$$Lrs=G1*Lts+G2*Rts$$

$$Rrs=G3*Lts+G4*Rts$$

$$Crs=G5*Lts+G6*Rts$$

In the special case of three surround-sound channels (Ls, Rs, Cs), these generalized equations default to the well known mix equations where the Cs channel is reduced by 3 dB and added to the Ls and Rs channels as follows:

$$Lts=Ls+0.707Cs, \text{ and}$$

$$Rts=Rs+0.707Cs.$$

It is believed that actual Dolby Ex systems phase shift Ls and Rs by plus and minus 45 degrees, respectively, to provide more depth to the surround sound. The QS or SQ matrix systems cited in the PCT Publication teach that technique.

As shown in FIG. 4, in a Dolby Ex system 40 the studio 42 provides a 6.1 channel mix (L, R, C, Ls, Rs, Cs, Sub) where Cs is an additional center surround channel. A matrix encoder 44 applies the Prologic coding algorithm to the three surround sound channels (Ls, Cs, Rs) to matrix encode them into Lts and Rts. The 5.1 channels L, R, C, sub, Lts, Rts are encoded using an AC-3, Sony or DTS encoder 46 and recorded onto a media 48. A 5.1 decoder 50 decodes the audio data to reproduce the discrete L, R, C and Sub audio channels and pass the matrix encoded Lts and Rts channels to a matrix decoder 52, which matrix decodes the channels into Lrs, Crs and Rrs using the same active matrix techniques as the Pro Logic decoders. The 6.1 discrete channels are directed to discrete speakers 54 for audio playback.

It is important to note that the three discrete surround channels do NOT carry discrete signals. The same crosstalk and phase distortion limitations associated with Prologic are now reintroduced into what was a truly discrete multichannel system. While it is true that a listener's sensitivity to position and direction is less for rear signals, true discrete audio reproduction will provide better sound separation and directionality. For the same reasons consumers preferred 2-channel surround over mono surround they will prefer 3-channel discrete surround over matrixed 2 channel surround.

Dolby EX represents a first step toward enhanced multichannel audio. Dolby EX provides additional surround sound channels using existing 5.1 formats without increasing the bit rate. Furthermore, Dolby EX preserves the discrete coding of L, R, C and sub audio signals. However, Dolby EX achieves these desirable results by sacrificing the true discreteness of the surround sound channels. A 3:2:3 system will suffer the same crosstalk limitation as Pro Logic. 4:2:4 and greater systems will also suffer phase distortion problems due to the matrix decode.

Dolby cannot provide true discrete N.1 audio because audio quality and/or reliability will suffer. The PCT Publication contemplates and then dismisses a new N.1 format for truly discrete audio stating "Although, in theory, additional channels could be carried by reducing the symbol size in order to provide more bits and allowing the storage of more data in the same physical area, such a reduction would introduce unwanted difficulties in the printing process and require substantial modification or recorder and player units in the field." A true N.1 format would be incompatible with existing hardware and would require at least substantial modification if not total replacement.

Accordingly, there remains an unfulfilled need in the industry to provide a truly discrete multichannel surround sound environment with more than two surround channels while maintaining backward compatibility with existing 5.1 decoders without sacrificing audio quality or reliability.

SUMMARY OF THE INVENTION

In view of the above problems, the present invention provides a truly discrete multichannel audio environment with additional discrete audio signals while maintaining backward compatibility with existing decoders.

A truly discrete as well as a backward compatible mix for surround-sound, front or other discrete audio channels for cinema, home theater, or music by mixing additional discrete audio signals with the existing discrete audio channels into a predetermined format such as the 5.1 audio format. These additional discrete audio channels are separately encoded and appended to the predetermined format as extension bits in the bitstream.

In a 5.1 channel environment, the more than two discrete surround-sound audio signals (Ls, Rs, Cs, . . . ) are mixed into two discrete surround-sound channels (Lts,Rts). The front channels (L, R, C, sub) and the mixed surround-sound channels (Lts,Rts) are encoded using a standard 5.1 encoder. The additional discrete surround-sound audio signals (Cs, . . . ) are independently encoded and carried in a discrete extension surround-sound channel that is appended to the 5.1 bitstream as extension bits. The bitstream is compatible with a variety of decoder configurations including existing 5.1 decoders, a 5.1 decoder plus existing matrix decoders, a 5.1 decoder plus a mix decoder and a N.1 decoder. The inclusion of the additional discrete surround-sound audio signals in the bitstream makes possible the reproduction of true discrete multichannel audio when used with either the 5.1 decoder plus the mix decoder or the N.1 decoder.

A 5.1 decoder reads the 5.1 bitstream and ignores the extension bits. The 5.1 decoder decodes the Lts and Rts surround-sound channels and directs the mixed audio signals to the discrete left and right surround-sound speakers. Playback creates the discrete left and right surround-sound signals and a "phantom" surround-sound signal from the center surround (Cs) audio signal and any other additional surround signals that acoustically appears at the center of the left and right surround speaks. The phantom surround is completely devoid of any phase distortion.

The inclusion of a matrix decoder with the 5.1 decoder decodes the Lts and Rts channels into Lrs, Rrs and Crs matrixed audio signals, which are carried on discrete channels to left, right and center surround speakers. The Lrs, Rrs and Crs audio signals are not discrete and exhibit the crosstalk associated with matrix coding.

The inclusion of a mix decoder with the 5.1 decoder reads the extension bits and decodes the additional surround-sound audio signals (Crs, . . . ). The mix decoder subtracts the weighted surround sound audio signals (Crs, . . . ) from the left and right total surround-sound signals (Lrts,Rrts) to produce truly discrete surround-sound audio signals (Lrs, Rrs, Crs, . . . ), which are carried on discrete channels to discrete speakers. A true N.1 decoder incorporates the 5.1 decoder and mix decoder in a single box. Playback creates a truly discrete (discrete signals carried on discrete channels to discrete speakers) surround-sound environment in which the surround-sound portion exhibits improved sound separation and directionality. Unlike matrix-encoded surround-sound audio, the mix-encoded N.1 channel audio provides discrete playback without crosstalk.

These and other features and advantages of the invention will be apparent to those skilled in the art from the following detailed description of preferred embodiments, taken together with the accompanying drawings, in which:

DETAILED DESCRIPTION OF THE INVENTION

The present invention provides a multichannel audio format for a truly discrete as well as a backward compatible mix for surround-sound, front or other discrete audio channels in cinema, home theater, or music environments. The additional discrete audio signals are mixed with the existing discrete audio channels into a predetermined format such as the 5.1 audio format. In addition these additional discrete audio channels are encoded and appended to the predetermined format as extension bits in the bitstream. The existing base of multichannel decoders can be used in combination with a mix decoder to reproduce truly discrete N.1 multichannel audio. This allows a consumer or professional to choose whether to keep their existing audio systems and realize some of the benefits of additional surround-sound channels or to upgrade their systems by adding a mix decoder to realize truly discrete multichannel audio for the ultimate listening experience.

It is to be understood that the present approach is applicable to extend any predetermined multichannel audio format, of which 5.1 is the current standard, to greater number of channels of discrete audio while maintaining backward compatibility to the predetermined format. For example, a true 10.2 format may be adopted for certain very specialized audio systems. At some point after the adoption of such a 10.2 format it may be desirable to extend that format to even more channels. For purposes of clarity, the present invention will be described with reference to a 5.1 channel system without lack of generality.

Figure 5:
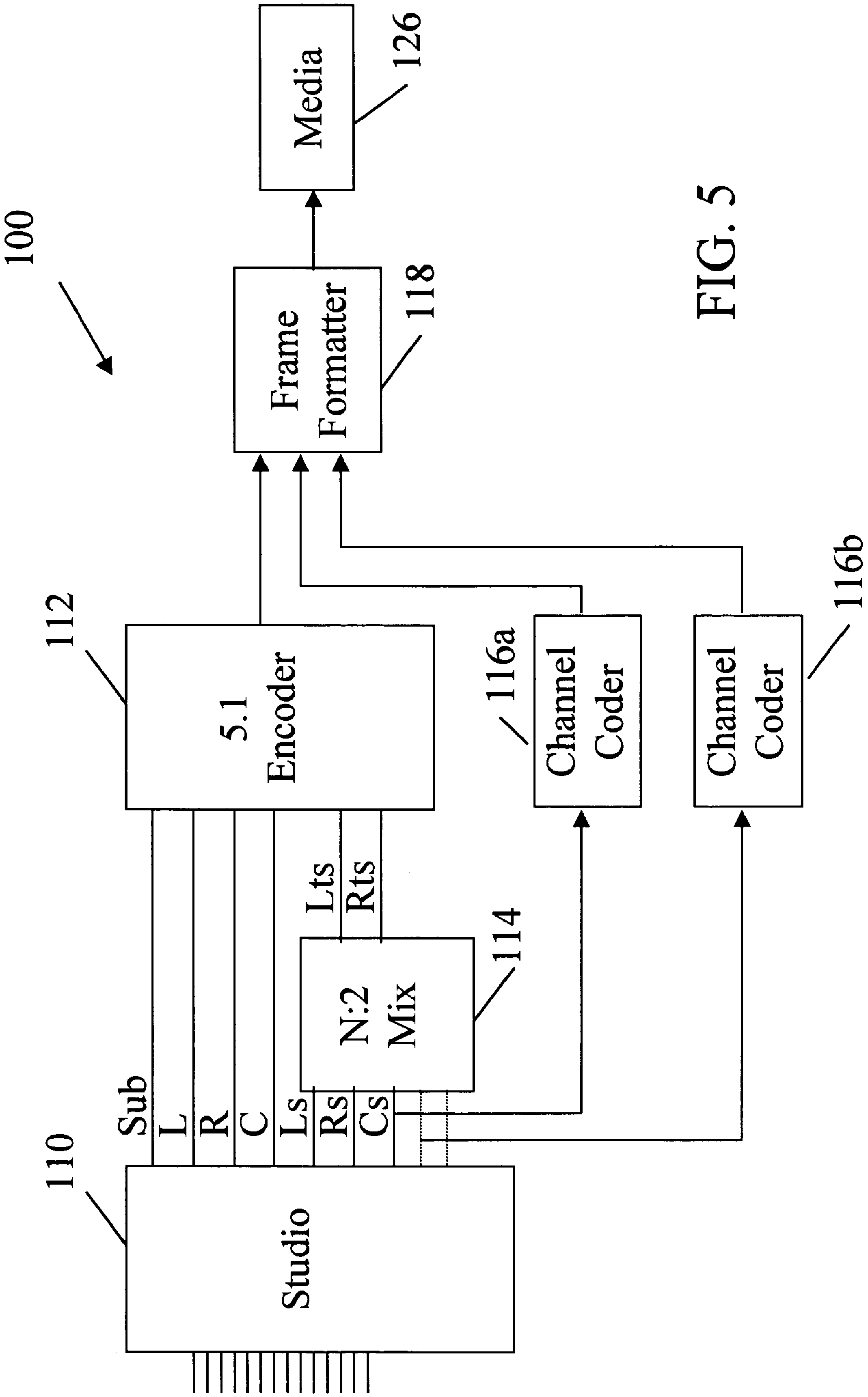
FIG. 5 is a block diagram of a surround-sound encoder in accordance with the present invention for providing discrete N.1 channel audio that is backward compatible with 5.1 channel audio.
Figure 6:
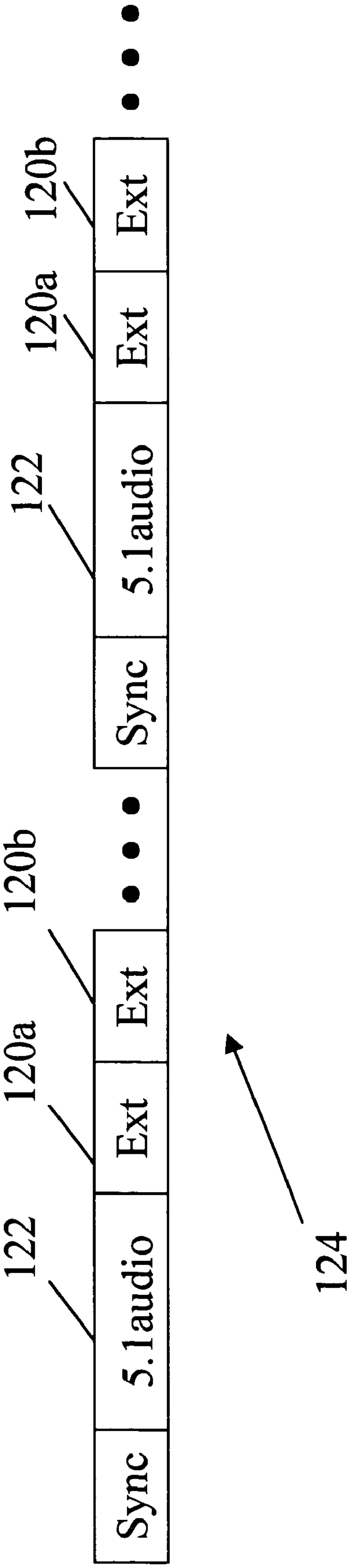
FIG. 6 is a schematic illustration of a N.1 channel bitstream in accordance with the present invention.

For purposes of clarity, the present invention will now be described with reference to the drawings in the context of a 5.1 channel system. FIG. 5 is a block diagram of a N.1 channel surround-sound encoder 100 in accordance with the present invention. A studio 110 provides an N.1 channel mix of which the L, R, C and Sub channels are passed directly to a 5.1 encoder 112 such as DTS Coherent Acoustics, Dolby AC-3 or Sony SDDS. The Ls, Rs, Cs and any other additional surround-sound channels are first passed to a mix encoder 114 that mixes the three or more channels into Lts and Rts channels, which are then passed to 5.1 encoder 112. 5.1 encoder 112 encodes the 5.1 channels and channel encoders 116*a*, 116*b*, . . . encode the additional surround-sound channels, respectively. The channel encoders may use the same 5.1 encoder defaulted to encode a single channel or other single channel encoders. A frame formatter 118 appends the extension bits 120*a*, 120*b*, . . . for each of the surround-sound channels to the 5.1 format bits 122 a frame at a time in bitstream 124 as shown in FIG. 6. Bitstream 124 is recorded on a media 126 such as a DVD, CD, DVT, or film in a digital format. With film optically recorded symbols represent the digital information, the digital information, in turn, represents discrete audio channels. Optical discs such as CDs or DVDs have pits impressed in the disc surface that represent digital information, the digital information, in turn, represents said discrete audio channels. Alternately, bitstream 124 could be encoded on a carried signal and broadcast to consumers. Backward compatibility is maintained because existing decoders read only the 5.1 bits and ignore the extension bits. True discrete multichannel audio is achieved with a new mix decoder that reads both the 5.1 and extension bits.

The inclusion of the additional surround-sound audio signals in both the two-channel mix and discrete channels eliminates the need to introduce a phase-shift in order to decode the three or more audio channels. As such, mix encoder 114 has more flexibility to mix the surround-sound channels. For example, a coherent mix introduces no phase-shifts or delays. This has the advantage that neither a direct 5.1 decode that produces a "phantom" surround channel or a 2:3 matrix-decode introduce phase distortion. Alternately, mix encoder 114 could phase-shift the Ls and Rs signals to improve the depth of the matrix decoded surround-sound audio. The key is that the phase term is not needed in order to decode, and that the inclusion of the additional channels in the bitstream allows the mix decoder to reproduce discrete audio for either mix approach.

Assuming a coherent mix, the generalized mixing equations are as follows:

$$Lts=Ls+\Sigma GiSi \text{ for } i=0, 1, 2, \ldots$$

$$Rts=Rs+\Sigma HiSi \text{ for } i=0, 1, 2, \ldots$$

where Gi and Hi are the gain coefficients and Si are the additional surround-sound channels.

In the special case of three surround-sound channels (Ls, Rs, Cs), these generalized equations default to the well known mix equations where the Cs channel is reduced by 3 dB and added to the Ls and Rs channels as follows:

$$Lts=Ls+0.707Cs, \text{ and}$$

$$Rts=Rs+0.707Cs.$$

At this one point, a 3:2 mix of a center surround channel, the matrix-encode equations for the Dolby EX system and the mix-encode equations of the present invention each default to the standard technique for mixing a center channel with left and right channels. Although the mix equations are identical at this one point, the system of the present invention is fundamentally different than either Dolby EX or standard mixing practice. In those instances the additional signals are only mixed into the left and right signals thereby sacrificing the ability to reproduce discrete multichannel audio. The present invention details a method for both producing discrete multichannel audio while maintaining backward compatibility. Unlike Dolby EX, this approach requires additional bits (space) to encode the bitstream. However, as evidenced by the earlier adoption of left/right surround to replace mono surround, true discrete surround-sound audio will replace matrix-decoded surround-sound audio.

The bitstream is compatible with a variety of decoder configurations including existing 5.1 decoders, a 5.1 decoder plus existing matrix decoders, a 5.1 decoder plus a mix decoder and a N.1 decoder. Mixing the additional surround-sound signals with the left and right surround signal provides backward compatibility. The inclusion of the additional discrete surround-sound audio signals in the bitstream makes possible the reproduction of true discrete multichannel audio when used with either the 5.1 decoder plus the mix decoder of the N.1 decoder.

Figure 7:
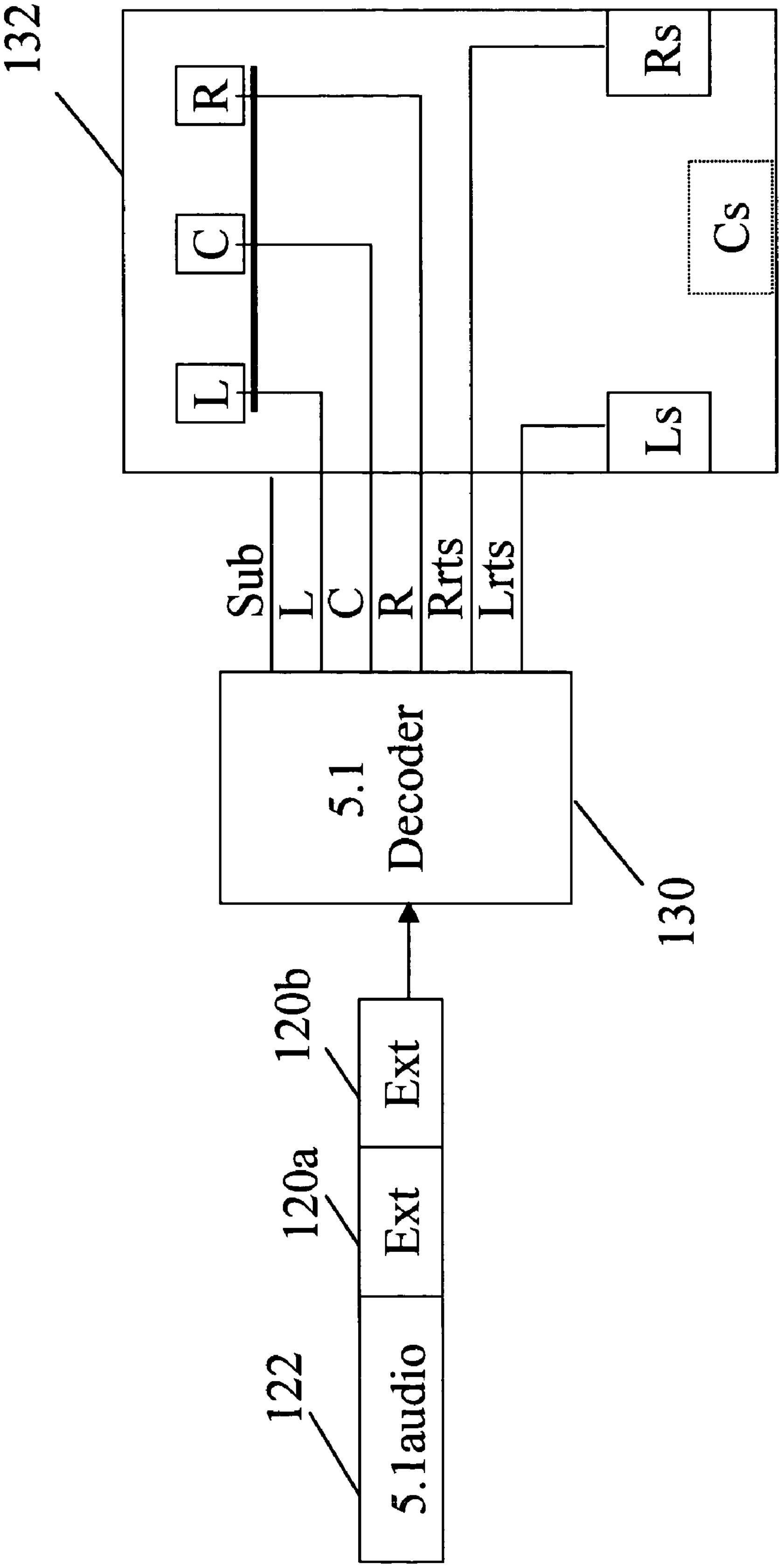
FIG. 7 is a block diagram and schematic plan view of a known 5.1 decoder with a loudspeaker arrangement for reproducing left (L), center (C), right (R), left surround (Ls), right surround (Rs) and "phantom" center surround (Cs) audio channels based on a 3:2 mix in accordance with the present invention.

As shown in FIG. 7 a conventional 5.1 decoder 130 decodes bitstream 124 a frame at a time by detecting the sync bit, reading 5.1 formatted bits 122 and ignoring extension bits 120*a*, 120*b*, . . . Decoder 130 decodes the 5.1 bits to reproduce left (Lr), center (Cr), right (Rr), subwoofer (Sub), left surround (Lrts), and right surround (Rrts) discrete audio channels. The left, center, right and sub discrete channels, which carry respective discrete audio signals, are directed to discrete speakers L, C, R and Sub (not shown) in a loudspeaker arrangement 132 for playback. The left and right surround channels, which carry a three-channel mix, are directed to discrete speakers Ls and Rs. This creates a "phantom" center surround (Crs) audio signal that appears acoustically between the Ls and Rs speakers without the benefit of an actual speaker. The position of the phantom surround can be varied by adjusting the mix but is typically a center surround. Consumers with existing 5.1 decoders can choose not to upgrade and still receive a compatible mix.

A conventional 5.1 decoder when used in a 3:2:3 system reproduces the same multichannel audio experience for the encoding techniques described in FIGS. 5 and 6 as it would with Dolby EX encoded audio data (provided the Ls and Rs signals in Dolby EX are not phase shifted by 45 degrees). However, for N:2:N systems where N>3 or N=3 and the Ls and Rs signals are phase shifted the audio experience is not the same. The encoding techniques of the present invention will not exhibit the phase distortion problems associated with Dolby EX.

Figure 8:
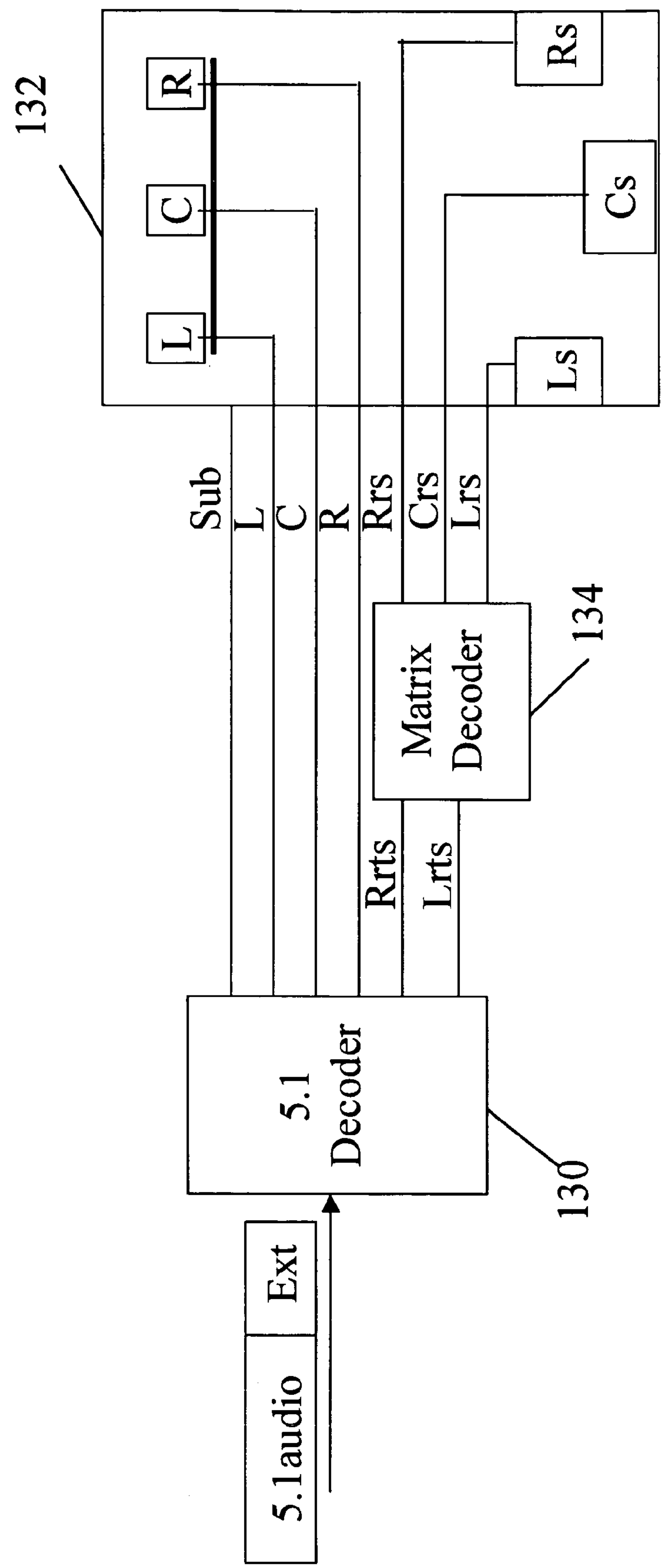
FIG. 8 is a block diagram and schematic plan view of a 5.1 decoder and matrix decoder with a loudspeaker arrangement for reproducing left (L), center (C), right (R), left surround (Ls), right surround (Rs) and center surround (Cs) audio channels.

As shown in FIG. 8, the basic playback configuration depicted in FIG. 7 can be enhanced by the addition of a matrix decoder 134 and a center channel speaker Cs. Matrix decoder 134 matrix decodes the left and right surround-sound channels Lrts and Rrts into three discrete audio channels Rrs, Crs and Lrs that are directed to respective speakers Ls, Cs and Rs for playback. Although the channels are discrete the signals they carry are not. The dematrixed audio signals exhibit the same crosstalk and phase distortion drawbacks as discussed above in connection with the Dolby ProLogic system.

Figure 1:
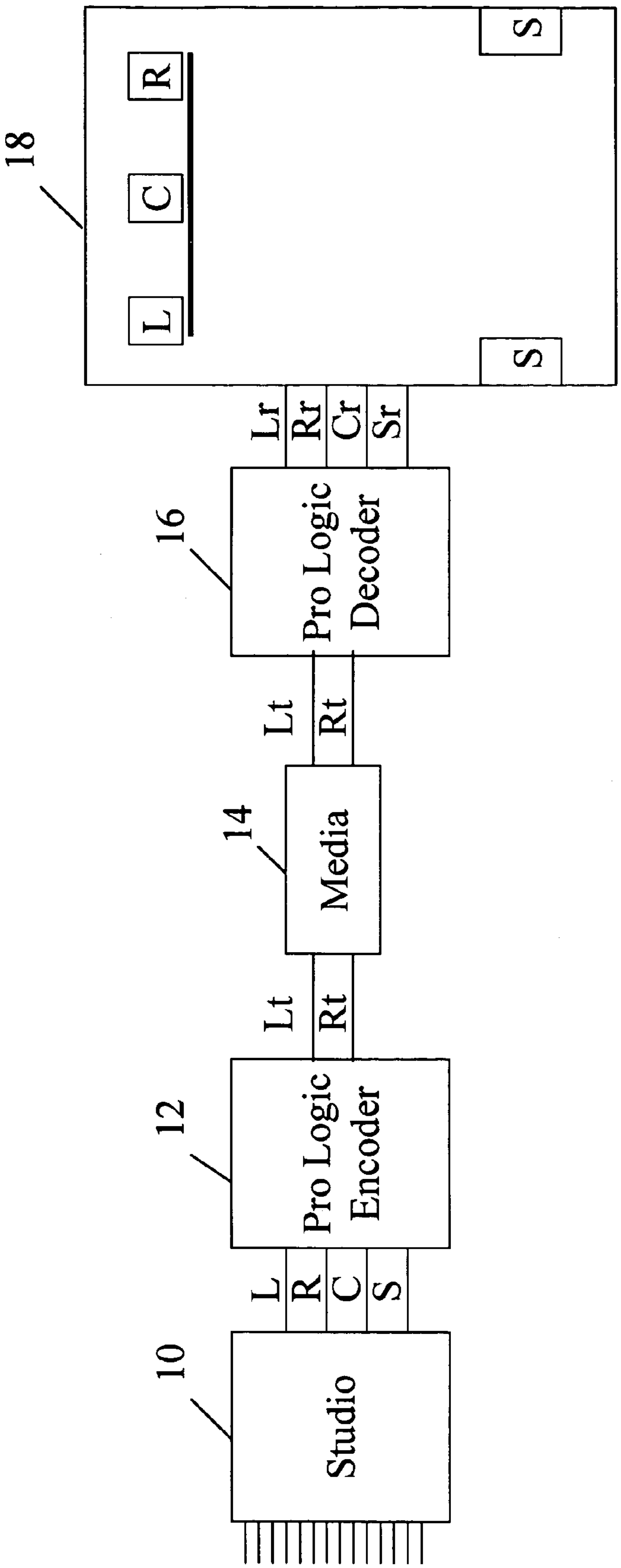
FIG. 1 (Prior Art)
FIG. 1, as described above, is a block diagram and schematic plan view of a known Dolby Prologic surround-sound system and a theater showing idealized loudspeaker locations for reproducing left (L), center (C), right (R) and surround (S) motion picture soundtrack channels.
Figure 2:
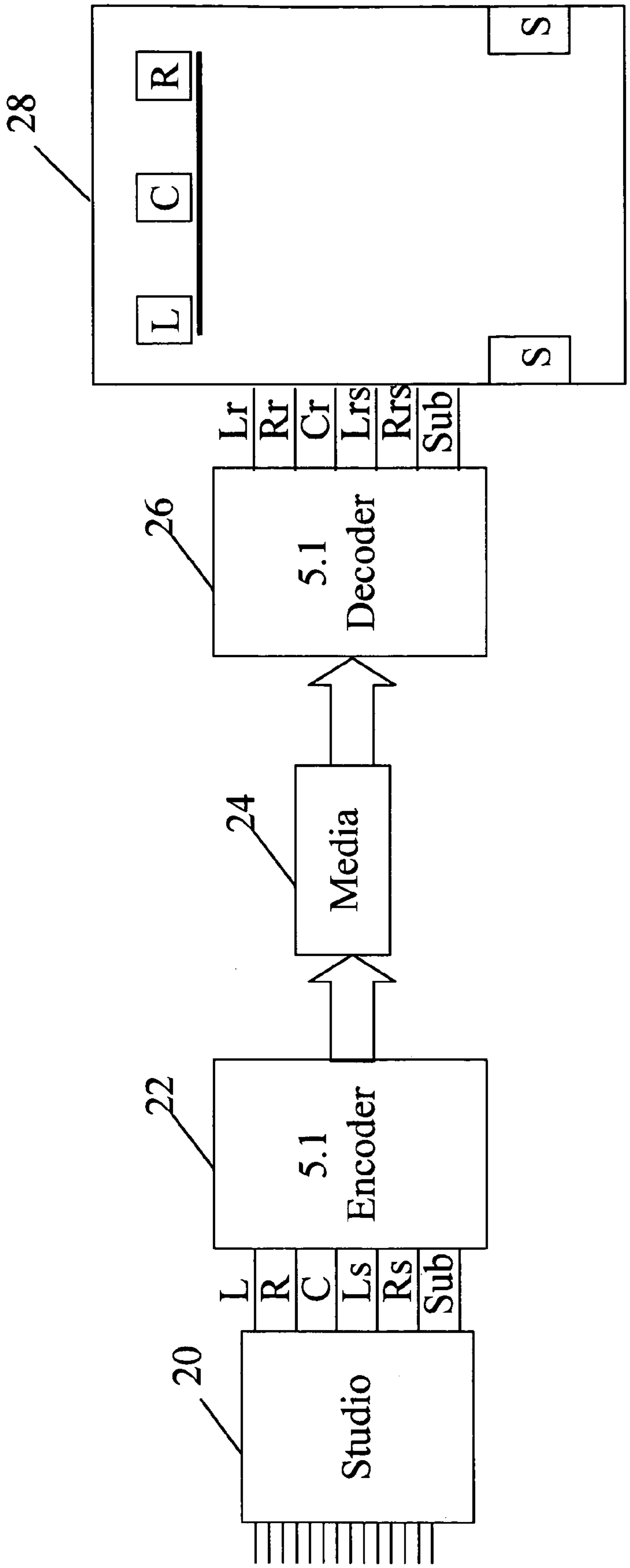
FIG. 2 (Prior Art)
FIG. 2, as described above, is a block diagram and schematic plan view of a known 5.1 surround-sound system and a theater showing idealized loudspeaker locations for reproducing left (L), center (C), right (R), sub and surround (S) motion picture soundtrack channels.
Figure 3:
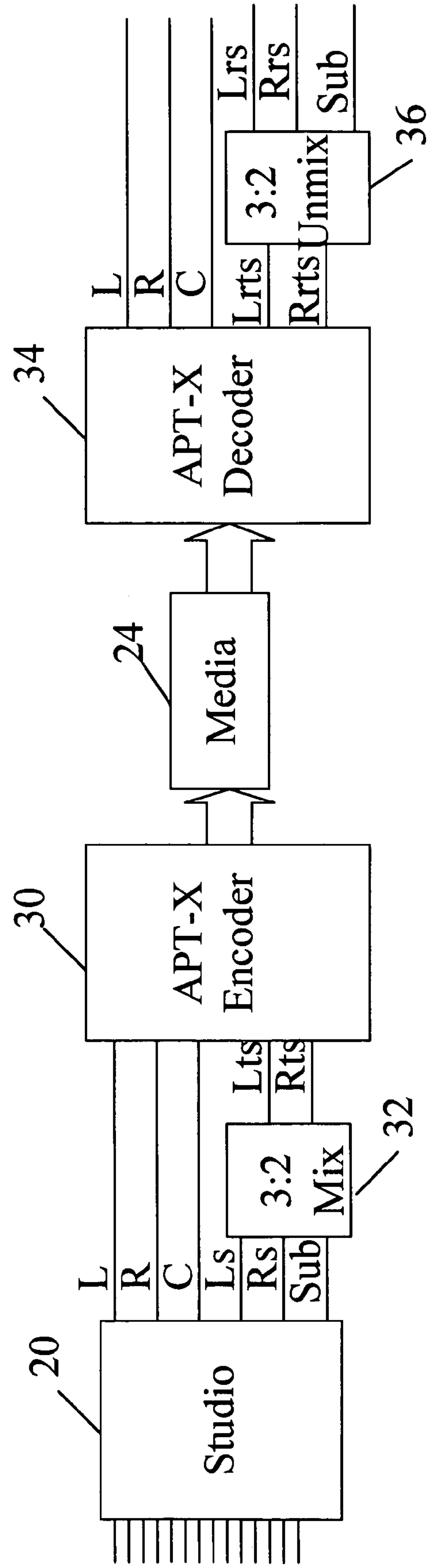
FIG. 3 (Prior Art)
FIG. 3, as described above, is a block diagram of a known DTS 5.1 surround-sound system that uses a 5-channel APT-X encoder.
Figure 4:
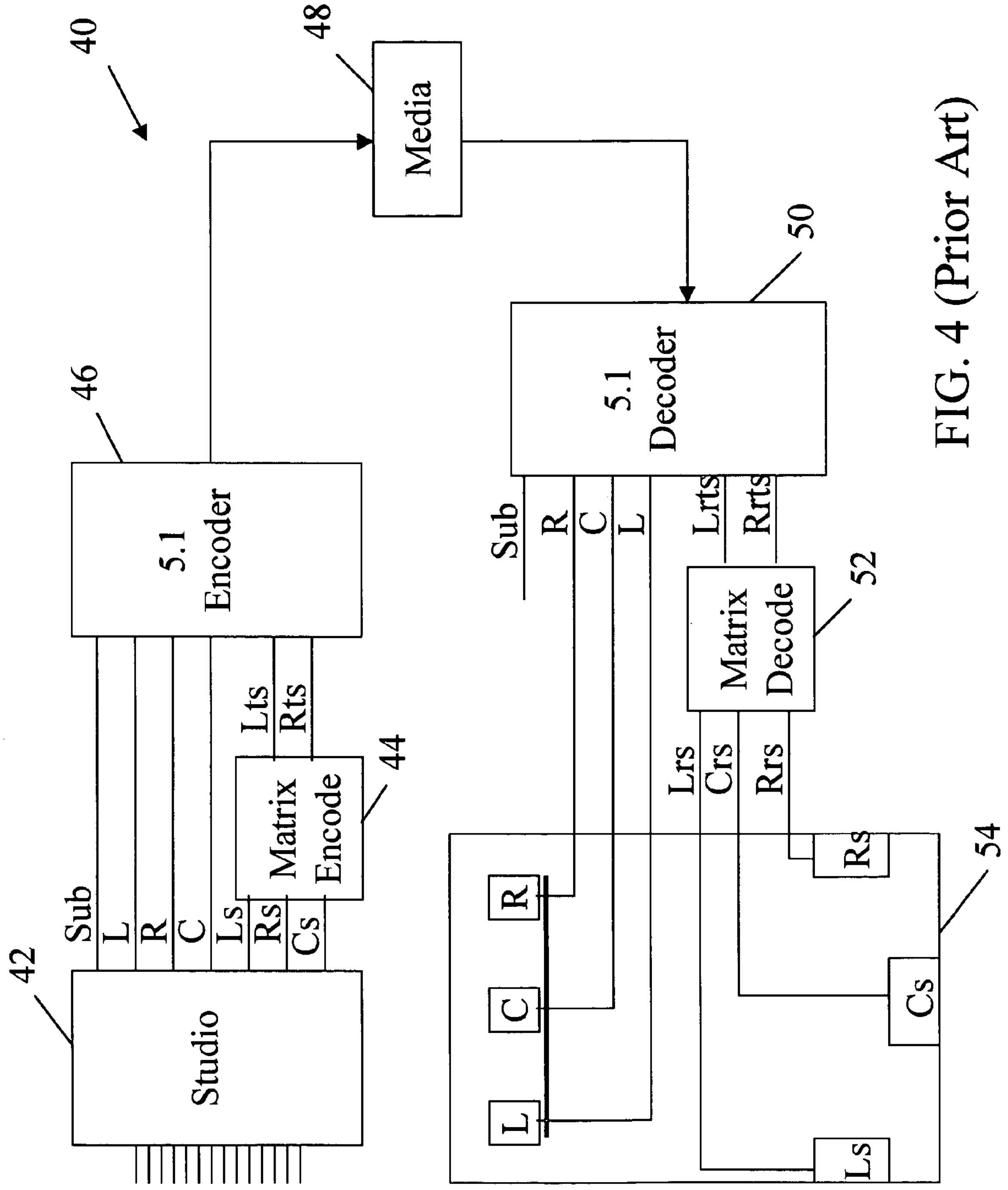
FIG. 4 (Prior Art)
FIG. 4, as described above, is a block diagram and schematic plan view of a known Dolby EX surround-sound system and a theater showing idealized loudspeaker locations for reproducing left (L), center (C), right (R), left surround (Ls), right surround (Rs) and center surround (Cs) motion picture soundtrack channels.

As discussed above in reference to FIG. 4, the Dolby EX system is designed for use with a 5.1 decoder and matrix decoder having this same configuration. Again the 3:2:3 systems may be equivalent but the N:2:N will differ due to the phase-shift components in Dolby EX encoding. In practice even when N=3 there is a 45 degree phase shift applied to the Ls and Rs signals.

As illustrated in FIGS. 7 and 8, the mix encoding techniques of the present invention maintain backward compatibility with 5.1 decoders and matrix decoders. The audio performance is equivalent to Dolby EX for 3:2:3 systems and improved when additional surround-sound channels are encoded.

Figure 9:
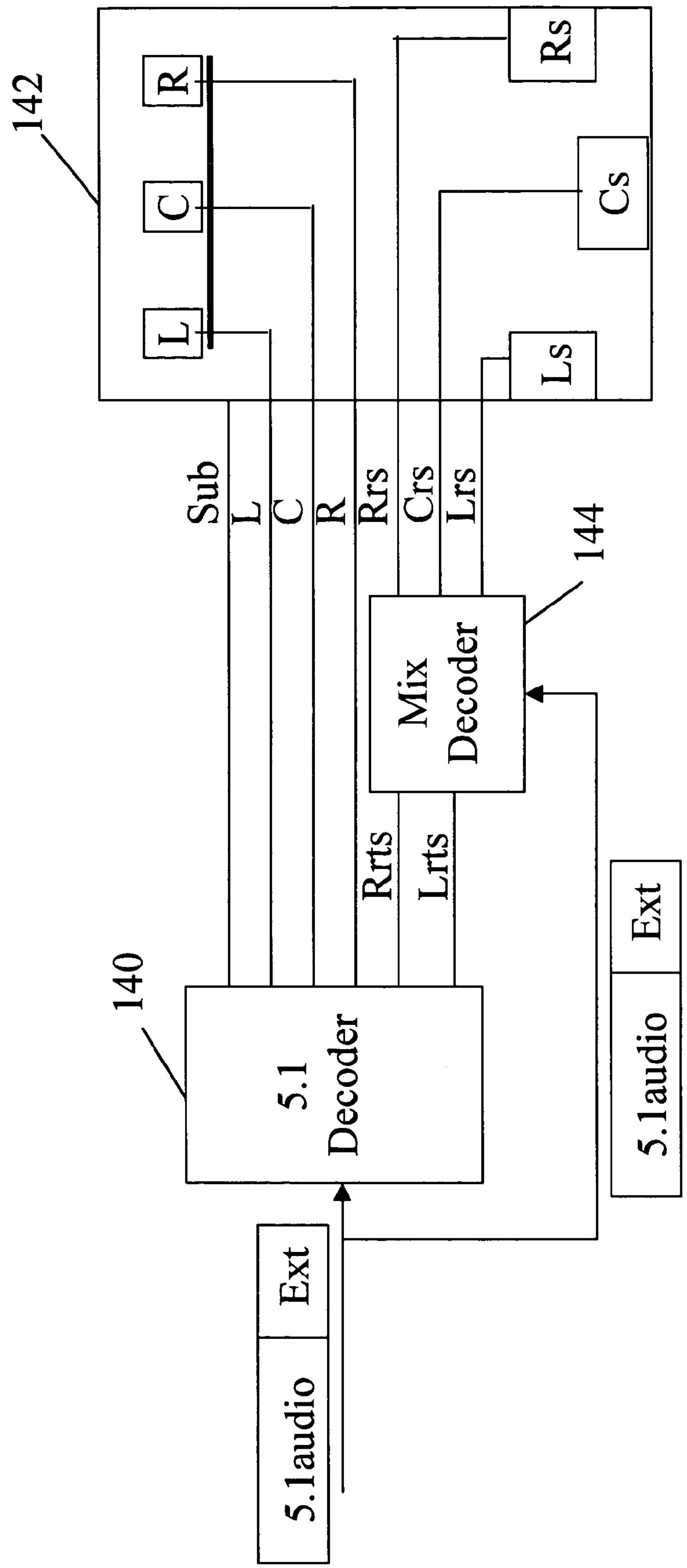
FIG. 9 is a block diagram and schematic plan view of a 5.1 decoder with a mix decoder with a loudspeaker arrangement for reproducing left (L), center (C), right (R), left surround (Ls), right surround (Rs) and center surround (Cs) audio channels in accordance with the present invention.
Figure 10:
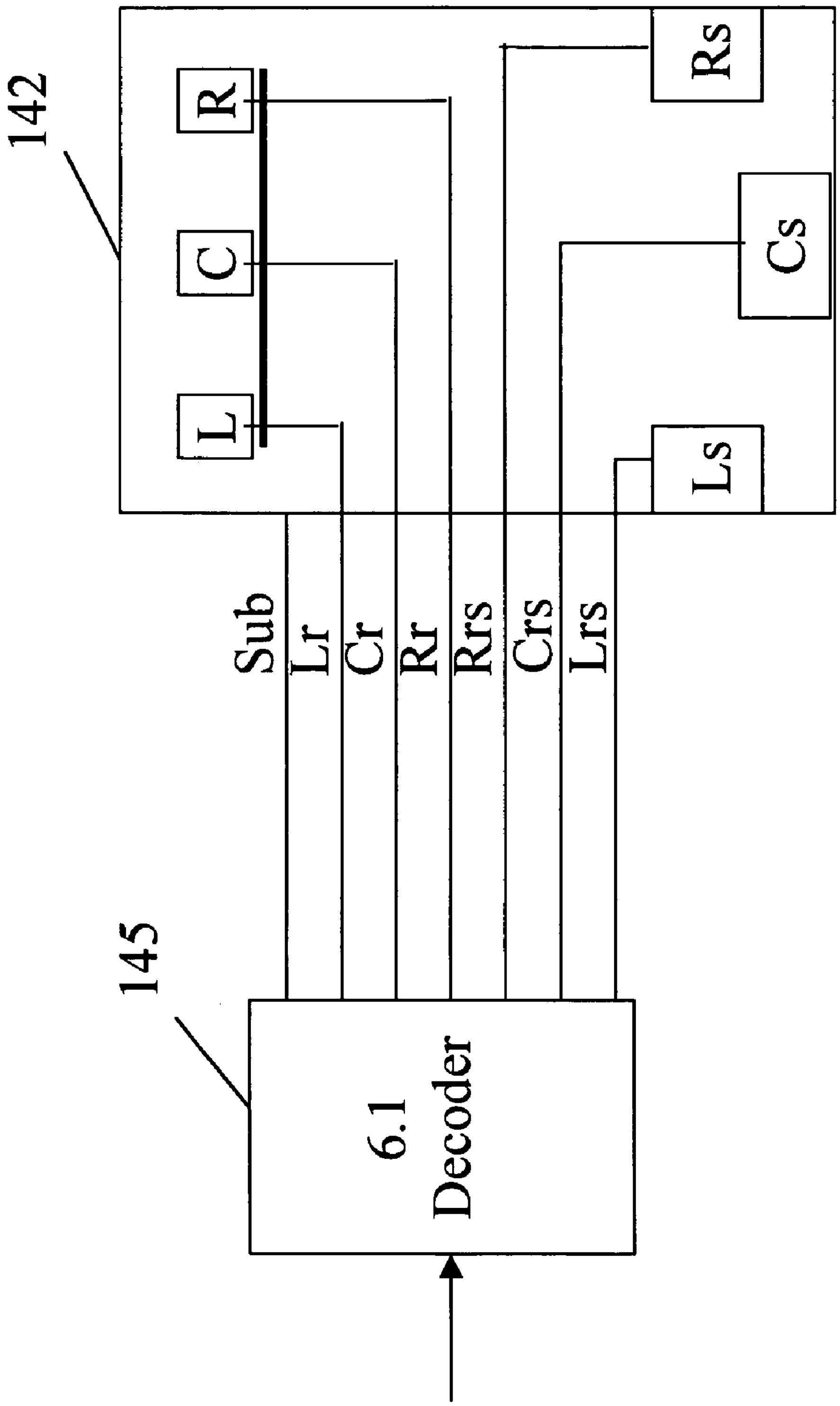
FIG. 10 is a block diagram and schematic plan view of a 6.1 decoder with a loudspeaker arrangement for reproducing left (L), center (C), right (R), left surround (Ls), right surround (Rs) and center surround (Cs) audio channels.
Figure 11:
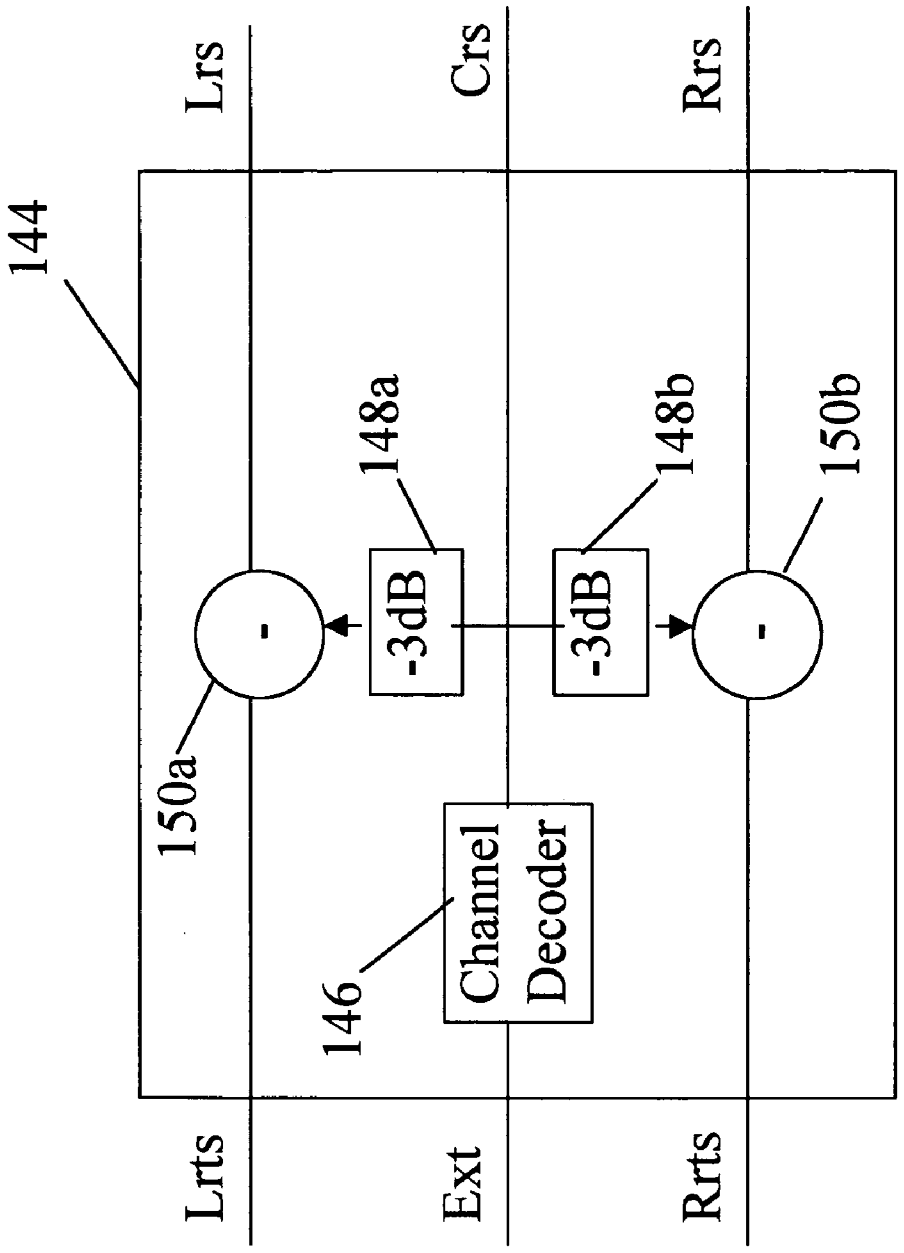
FIG. 11 is a schematic diagram of the mix decoder shown in FIG. 9 and incorporated in the 6.1 decoder shown in FIG. 10.

The distinct advantage of the present encoding and formatting techniques over Dolby EX, as illustrated in FIGS. 9–11, is the ability to reproduce truly discrete N.1 channel audio; discrete signals carried on discrete channels to discrete speakers. As evidenced by the industry's move from matrix encoded/decoded multichannel audio to discrete 5.1 audio earlier, the consumer will prefer discrete N.1 channel audio over matrix-decoded N.1 channel audio.

As shown in FIG. 9, a 5.1 decoder 140 reads the 5.1 audio 122 from bitstream 124 and ignores the extension bits 120*a*, 120*b*, . . . , decodes the L, C, R and Sub signals and passes them to respective speakers in a loudspeaker arrangement 142. Decoder 140 decodes the Lts and Rts signals and passes them to a mix decoder 144, which ignores the 5.1 audio bits and reads the extension bits. Mix decoder 144 decodes each of these additional surround-signals and uses them to separate the three or more surround-sound signals Lrs, Crs and Lrs from the Lts and Rts, which are passed to discrete speakers Ls, Cs and Rs. As shown in FIG. 10, an N.1 decoder 145 incorporates the functions of the 5.1 decoder and mix decoder in one box.

As shown in FIG. 11, mix decoder 144 includes a channel decoder 146 that decodes the additional surround-sound channel Crs from the extension bits and directs it to the center surround-sound speaker Cs. Mix decoder 144 weights Csr (148*a*, 148*b*), e.g. reduces it by 3 dB, and subtracts (150*a*, 150*b*) it from the Ltrs and Rtrs signals to remove all traces (except quantization noise) of the center surround-sound channel Cs leaving only the discrete Lrs and Rrs signals, which are directed to left and right surround-sound speakers Ls and Rs. More specifically the decode equations for a 2:3 decoder are as follows:

$$Lsr = Lts - 0.707Csr, \text{ and}$$

$$Rsr = Rts - 0.707Csr$$

The circuit is easily expandable to accommodate more than three surround-sound signals by using additional channel decoders, multipliers and summing nodes.

As shown in FIGS. 9–11, the incorporation of the additional surround-signals at mix decoder 144 provides the N equations for the N unknowns in the mixed audio signal carried on Lts and Rts. As a result, other than quantization noise, the process of separating the audio signals is exact, i.e. no crosstalk or phase distortion. Therefore consumers who upgrade by purchasing either a mix decoder for use with their 5.1 decoder or a new N.1 decoder receive all the benefits of a truly discrete (signal, channel & speaker) system and an N.1 bitstream format.

It is important to note that the audio quality obtained by mixing the three or more surround-sound channels into a 5.1 format and appending the additional surround-sound signals as extension bits, and separating the audio signals as just described would be substantially the same as the audio quality associated with a true N.1 format, which would not be backward compatible with 5.1 systems. This slight advantage is easily outweighed by the necessity to provide backward compatibility.

Although the described audio mixing/separating techniques and modified bitstream format are generally applicable to all 5.1 formats including Dolby-AC3 and Sony SDDS they are particularly well suited for use with the DTS Coherent Acoustics, which has the ability to vary frame size as is described in detail in U.S. Pat. No. 5,978,762. The variable frame size can be used to accommodate additional surround-sound channels, i.e. the extension bits by either a) reducing the frame size or b) adaptively changing the frame size. Dolby AC-3 has a fixed frame size with insufficient bits to accommodate the extension bits without sacrificing fidelity of the reconstructed audio signals.

The DTS Coherent Acoustics encoder/decoder can vary its frame size by one bit at a time. DTS Coherent Acoustics has the flexibility to reduce frame size to increase the bit rate to accommodate N.1 systems and particularly the extra extension bits. The reduction of frame size increases the percentage of bits allocated to overhead and reduces the flexibility for bit allocation but allows true discrete N.1 channel audio to be reproduced with sufficient sound quality.

Figure 12:
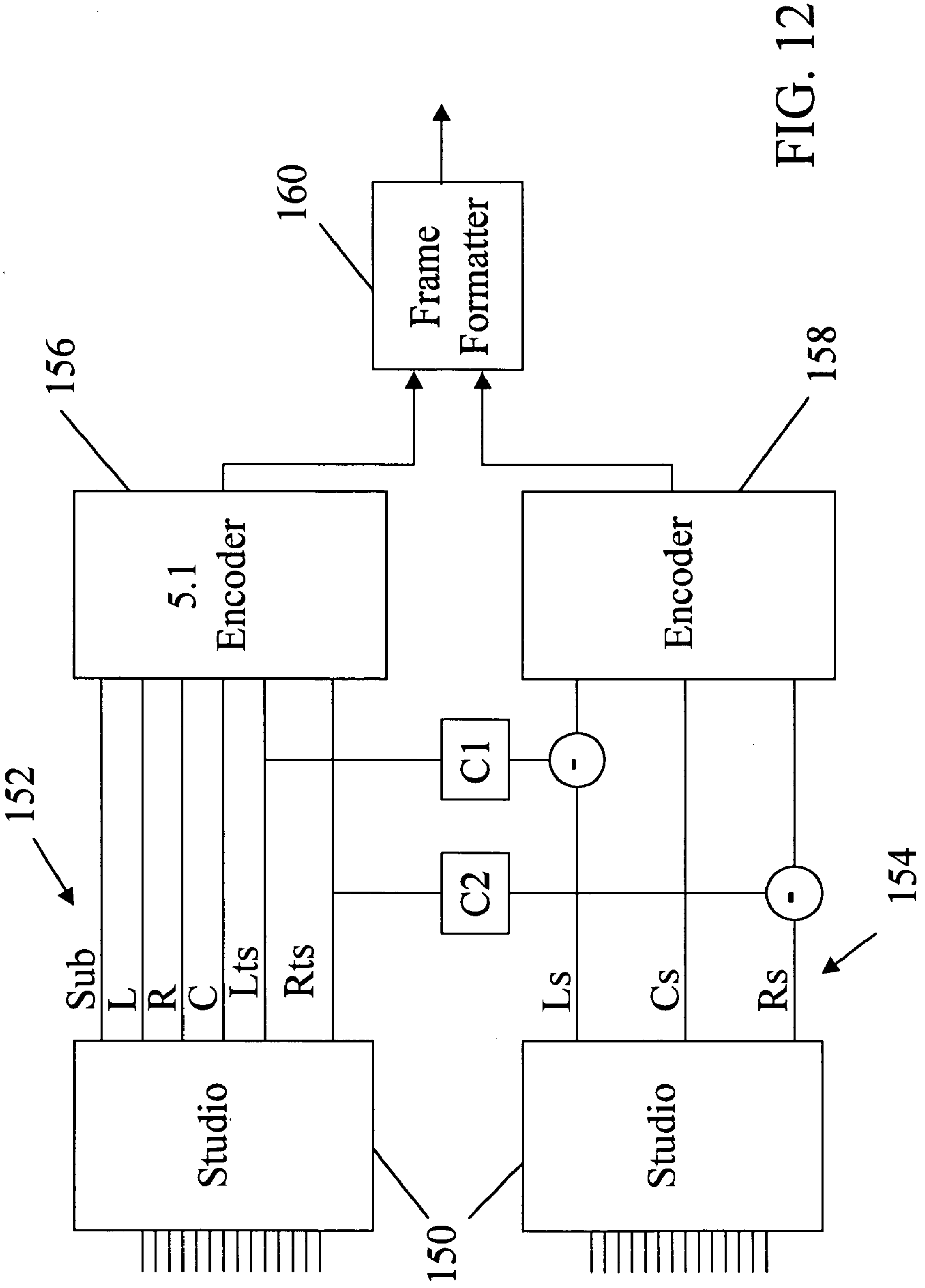
FIG. 12 is a block diagram of an alternate embodiment for the N.1 channel encoder, which provides enhanced mixing capability but requires both a 5.1 and N.1 mix from the studio and additional extension bits.

An alternate embodiment for encoding N.1 channel audio (N=3 as depicted) is shown in FIG. 12. This approach provides enhanced mixing capability but requires both a 5.1 and 6.1 mix from the studio and additional extension bits. Studio 150 provides both a 5.1 mix 152 and a 6.1 mix 154 of which only the Ls, Cs and Rs channels are used. The Lts and Rts channels of the 5.1 mix have been mixed by the studio to include the Cs channel. The 5.1 mix is passed to a 5.1 encoder 156 that encodes the multichannel signal into a standard 5.1 audio format.

The Lts and Rts audio channels are weighted by coefficients C1 and C2 and subtracted from the Ls and Rs audio channels from the 6.1 mix 154, respectively, to produce difference signals dLs and dRs. An encoder 158 encodes Cs, dLs and dRs and passes them to a frame formatter 160 that appends them as extension bits to the 5.1 audio format in the bitstream. Each additional channel added after 6.1 adds one new channel to the extension bits. This approach is not constrained by simple linear equations to mix the signals but requires two additional channels, dLs and dRs to encode the audio data.

To this point the invention has been described as a technique for mixing three or more surround-sound channels into the left and right surround-sound channels. Although this is the current application for such techniques, the same techniques can be used to provide a truly discrete as well as a backward compatible mix for additional front channels, side channels, subwoofer or any other discrete channels.

Figure 13:
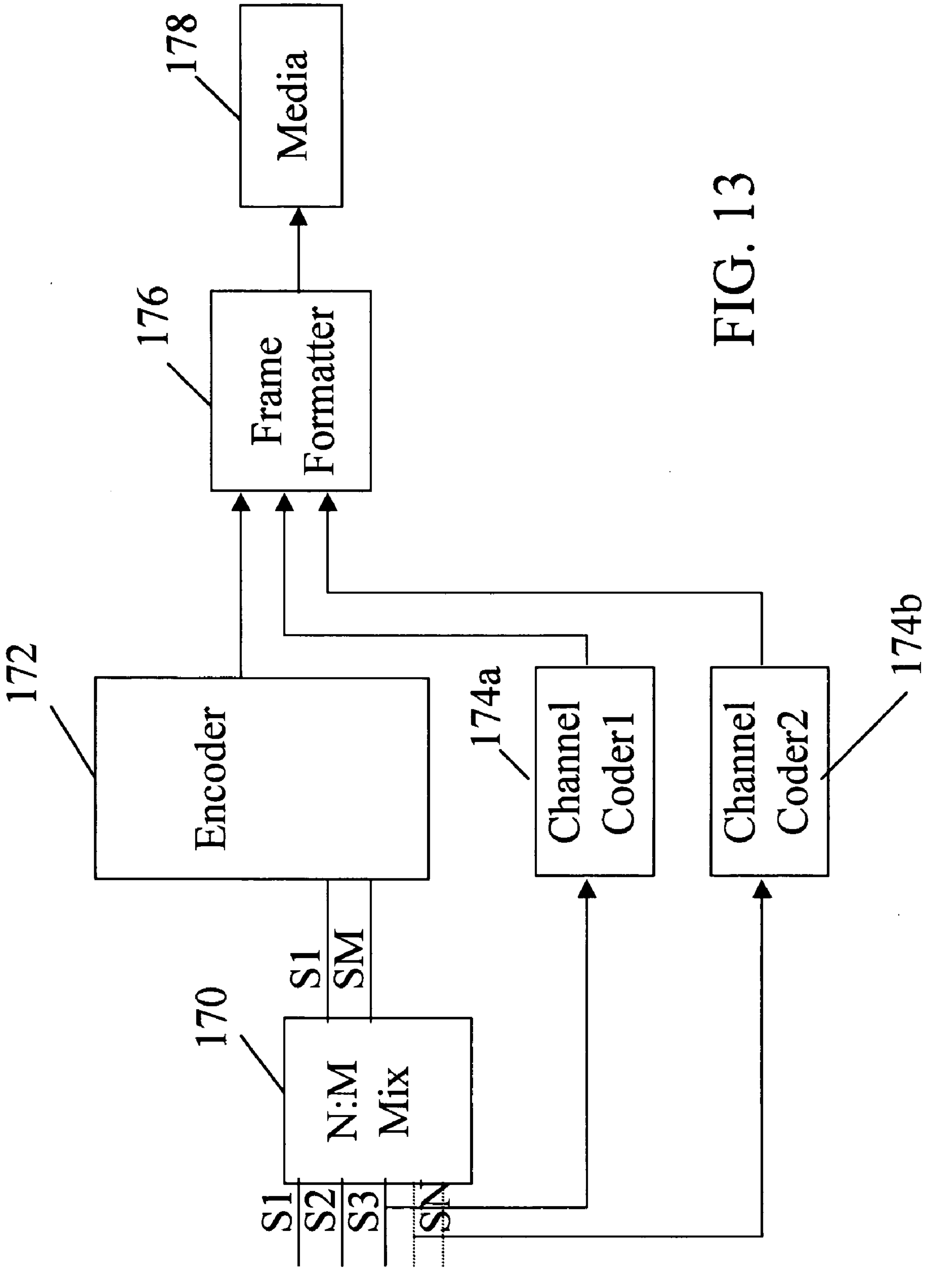
FIG. 13 is a block diagram of a multichannel audio encoder for providing a truly discrete as well as a backward compatible mix for surround-sound, front or other discrete channels.

As shown in FIG. 13, an N:M Mixer 170 mixes N discrete input signals into M channels that carry the N-channel mix. An encoder 172 encodes the M-channel audio signal into a predetermined format. Channel coders 174*a*, 174*b*, . . . encode each of the L=N−M additional discrete audio signals. A frame formatter 176 appends the encoded additional signals as extension bits to the predetermined format in a bitstream, which is then recorded on a media 178. This describes a general approach for extending a predetermined multichannel audio format to a greater number of discrete channels while maintaining backward compatibility with decoders designed for the predetermined format.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A method of reproducing multichannel audio, comprising:

receiving a bitstream including a plurality of discrete front audio channels that carry at least left, right and center front audio signals and discrete left and right surround-sound audio channels that carry a mix of left, right and center surround-sound audio signals in a predetermined discrete multichannel audio format and a discrete surround-sound extension channel that carries the center surround-sound audio signal as extension bits appended to said predetermined discrete multichannel audio format;

reading out the bits in the predetermined discrete multichannel audio format;

decoding the bits in the predetermined discrete multichannel audio format to reproduce said discrete front audio channels and said discrete left and right surround-sound audio channels;

reading out the extension bits;

decoding the extension bits to provide the discrete surround-sound extension channel;

mix decoding the discrete left and right surround-sound audio channels using the surround-sound extension channel to provide discrete left, right and center surround-sound audio channels that carry the left, right and center surround-sound audio signals, respectively;

applying the discrete front audio channels and the discrete left, right and center surround-sound audio channels to respective speaker channels to reproduce the front audio signals and discrete left, right and center surround-sound audio signals.

2. The method of claim 1, wherein said center surround-sound audio signal was reduced by approximately 3 dB and mixed in-phase with said left and right surround-sound audio signals onto the discrete left and right surround-sound audio channels.

3. The method of claim 1, wherein said discrete front audio channels, discrete surround-sound audio channels and discrete extension surround-sound channel are recorded in the bitstream as a sequence of audio frames whose size varies from frame-to-frame to accommodate the discrete extension surround-sound channels, said bits being reading out of said sequence a frame at a time in accordance with the frame size.

4. An apparatus for reproducing multichannel audio, comprising:

A multichannel audio decoder configured to (a) receive a bitstream including a plurality of discrete front audio channels that carry at least left, right and center front audio signals and discrete left and right surround-sound audio channels that carry a mix of left, right and center surround-sound audio signals in a predetermined discrete multichannel audio format and a discrete surround-sound extension channel that carries the center surround-sound audio signal as extension bits appended to said predetermined discrete multichannel audio format, (b) read out the bits in the predetermined discrete multichannel audio format, (c) decode the bits in the predetermined discrete multichannel audio format to reproduce said discrete front audio channels and said discrete left and right surround-sound audio channels and (d) apply the discrete front audio channels to respective speaker channels to reproduce the front audio signals; and A mix decoder configured to (a) read out the extension bits, (b) decode the extension bits to provide the discrete surround-sound extension channel, (c) mix decode the discrete left and right surround-sound audio channels using the surround-sound extension channel to provide discrete left, right and center surround-sound audio channels that carry the left, right and center surround-sound audio signals, respectively, and (d) apply the discrete left, right and center surround-sound audio channels to respective speaker channels to reproduce the discrete left, right and center surround-sound audio signals.

5. The apparatus of claim 4, wherein said center surround-sound audio signal was reduced by approximately 3 dB and mixed in-phase with said left and right surround-sound audio signals onto the discrete left and right surround-sound audio channels.

6. The apparatus of claim 4, wherein said discrete front audio channels, discrete surround-sound audio channels and discrete extension surround-sound channel are recorded in the bitstream as a sequence of audio frames whose size varies from frame-to-frame to accommodate the discrete extension surround-sound channels, said bits being reading out of said sequence a frame at a time in accordance with the frame size.

* * * * *